US011015577B2

(12) United States Patent
Son et al.

(10) Patent No.: US 11,015,577 B2
(45) Date of Patent: May 25, 2021

(54) WIND FARM SUPERVISION MONITORING METHOD, OPERATION AND MAINTENANCE PLAN CONTROLLED FROM A MOBILE TERMINAL OF A WORKER AT A REMOTE LOCATION AND USING WORK TICKETS

(71) Applicant: DOOSAN HEAVY INDUSTRIES & CONSTRUCTION CO., LTD., Changwon-si (KR)

(72) Inventors: Jong duk Son, Suwon-si (KR); Jeong Hoon Lee, Daejeon (KR); Sung Tae Kim, Seoul (KR); Seung Man Eom, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 174 days.

(21) Appl. No.: 15/432,222

(22) Filed: Feb. 14, 2017

(65) Prior Publication Data
US 2017/0350370 A1    Dec. 7, 2017

(30) Foreign Application Priority Data

Jun. 2, 2016    (KR) .................. 10-2016-0068879

(51) Int. Cl.
*F03D 7/04*    (2006.01)
*F03D 17/00*    (2016.01)
(Continued)

(52) U.S. Cl.
CPC ............ *F03D 7/048* (2013.01); *F03D 7/047* (2013.01); *F03D 17/00* (2016.05); *F03D 80/50* (2016.05);
(Continued)

(58) Field of Classification Search
CPC .......... F03D 7/048; F03D 17/00; F03D 80/50; F03D 7/047; G06Q 10/0631;
(Continued)

(56) References Cited

U.S. PATENT DOCUMENTS

| 6,925,385 | B2 * | 8/2005 | Ghosh | .................. | F03D 7/0284 |
| | | | | | 702/1 |
| 8,433,425 | B2 * | 4/2013 | Vasudevarao | ........... | F03D 7/048 |
| | | | | | 290/44 |

(Continued)

FOREIGN PATENT DOCUMENTS

| CN | 104166938 A | * | 11/2014 | ............. | Y04S 10/50 |
| EP | 2518309 A2 | | 10/2012 | | |

OTHER PUBLICATIONS

Communication dated Sep. 6, 2017 issued by the European Patent Office in counterpart application No. 17173756.2.
(Continued)

*Primary Examiner* — M.N. Von Buhr
(74) *Attorney, Agent, or Firm* — INVENSTONE Patent, LLC

(57) ABSTRACT

A wind farm supervision monitoring method includes: displaying, by a user interface (UI) unit, a location of the site server on a map along with a dashboard menu, a navigation menu, and an alarm & event menu; collecting, by a data collection unit, data about status monitoring of each wind turbine from the site server; detecting, by an abnormality status detection unit, an abnormality status of each wind turbine based on the data about the status monitoring of each wind turbine and issuing an alarm based on the detecting the abnormality status; providing, by a supervision unit, a turbine operation status of each wind turbine using the dashboard menu, managing operation and maintenance; and establishing, by the supervision unit, an operation and
(Continued)

maintenance plan for the detected abnormality status of the wind turbine.

**20 Claims, 12 Drawing Sheets
(3 of 12 Drawing Sheet(s) Filed in Color)**

(51) Int. Cl.
    *F03D 80/50*     (2016.01)
    *G06Q 10/00*     (2012.01)
    *G06Q 10/08*     (2012.01)
    *G06Q 10/06*     (2012.01)

(52) U.S. Cl.
    CPC ....... *G06Q 10/0631* (2013.01); *G06Q 10/087* (2013.01); *G06Q 10/20* (2013.01); *F05B 2270/504* (2013.01)

(58) Field of Classification Search
    CPC ...... G06Q 10/087; G06Q 10/20; G06Q 50/10; Y04S 10/54; Y04S 10/56; Y04S 10/50; Y02E 10/723; Y02E 10/72; F05B 2270/504; G05B 23/02; G05B 2219/24215
    See application file for complete search history.

(56) References Cited

U.S. PATENT DOCUMENTS

| | | | | |
|---|---|---|---|---|
| 8,560,368 | B1* | 10/2013 | Maity | G06Q 10/20 705/7.13 |
| 9,362,858 | B2* | 6/2016 | Ma | F03D 7/047 |
| 9,995,278 | B2* | 6/2018 | Lund | F03D 7/047 |
| 2002/0087220 | A1* | 7/2002 | Tveit | G05B 23/0283 700/22 |
| 2003/0191628 | A1* | 10/2003 | Hickman | G06F 16/29 704/9 |
| 2004/0230377 | A1* | 11/2004 | Ghosh | F03D 7/0284 702/3 |
| 2005/0090937 | A1 | 4/2005 | Moore et al. | |
| 2008/0281455 | A1* | 11/2008 | Swegman | G06Q 10/087 700/107 |
| 2009/0144115 | A1* | 6/2009 | Drew | G06Q 10/06311 705/7.12 |
| 2009/0181665 | A1* | 7/2009 | Safer | G06Q 10/0631 455/424 |
| 2010/0017252 | A1* | 1/2010 | Chaar | G06F 8/70 705/7.12 |
| 2010/0135788 | A1* | 6/2010 | Qu | F03D 7/047 416/1 |
| 2010/0280673 | A1* | 11/2010 | Woste | G05B 23/0235 700/287 |
| 2010/0280872 | A1* | 11/2010 | Scholte-Wassink | G06Q 10/06311 705/7.13 |
| 2011/0020122 | A1* | 1/2011 | Parthasarathy | F03D 17/00 416/61 |
| 2011/0077990 | A1* | 3/2011 | Storage | G06Q 10/087 705/7.41 |
| 2011/0106654 | A1* | 5/2011 | Lee | G06Q 10/06 705/26.8 |
| 2011/0125419 | A1* | 5/2011 | Bechhoefer | F03D 17/00 702/34 |
| 2011/0198854 | A1* | 8/2011 | Minami | F03D 7/047 290/55 |
| 2011/0204631 | A1* | 8/2011 | Minami | F03D 7/047 290/44 |
| 2011/0276828 | A1* | 11/2011 | Tamaki | G05B 23/0254 714/26 |
| 2011/0298213 | A1* | 12/2011 | Minami | F03D 7/048 290/44 |
| 2011/0313726 | A1* | 12/2011 | Parthasarathy | G05B 23/024 702/179 |
| 2012/0166249 | A1* | 6/2012 | Jackson | G05B 19/41865 705/7.28 |
| 2012/0173688 | A1* | 7/2012 | True | G06Q 10/06311 709/223 |
| 2012/0203507 | A1* | 8/2012 | Thomeer | E21B 41/0092 702/183 |
| 2012/0290946 | A1* | 11/2012 | Schrock | G09G 5/14 715/752 |
| 2013/0035798 | A1* | 2/2013 | Zhou | F03D 7/0292 700/287 |
| 2013/0253853 | A1* | 9/2013 | Wunderlin | G05B 23/0283 702/42 |
| 2013/0297060 | A1* | 11/2013 | Sundling, Jr. | G06Q 10/0631 700/100 |
| 2013/0332220 | A1* | 12/2013 | Nielsen | G06Q 10/20 705/7.21 |
| 2014/0257883 | A1* | 9/2014 | Thompson | G06Q 10/02 705/5 |
| 2014/0258165 | A1 | 9/2014 | Heil | |
| 2014/0279641 | A1* | 9/2014 | Singh | G06Q 50/265 705/325 |
| 2014/0285399 | A1* | 9/2014 | Jain | G06F 3/1423 345/1.2 |
| 2015/0094968 | A1* | 4/2015 | Jia | G06Q 40/04 702/60 |
| 2015/0100892 | A1* | 4/2015 | Cronin | G06Q 10/06 715/747 |
| 2015/0115609 | A1* | 4/2015 | Bohlen | F03D 7/047 290/44 |
| 2016/0005242 | A1* | 1/2016 | Hua | G06Q 10/00 701/29.3 |
| 2016/0034856 | A1 | 2/2016 | Son | |
| 2016/0276831 | A1* | 9/2016 | Karlak | H02J 3/00 |
| 2016/0314439 | A1* | 10/2016 | Pinkerton | H04W 4/029 |
| 2016/0333855 | A1* | 11/2016 | Lund | F03D 7/048 |
| 2016/0364648 | A1* | 12/2016 | Du | G06N 5/045 |
| 2017/0078841 | A1* | 3/2017 | Rose, Jr. | H04W 4/021 |
| 2017/0161671 | A1* | 6/2017 | Eom | F03D 80/50 |
| 2017/0335824 | A1* | 11/2017 | Gupta | H02J 3/381 |
| 2017/0352010 | A1* | 12/2017 | Son | G06F 17/30289 |
| 2018/0211198 | A1* | 7/2018 | Makhoul | H04M 1/7253 |

OTHER PUBLICATIONS

Korean Office Action dated Jan. 31, 2017, issued in corresponding Korean Patent Application No. 10-2016-0068879.

\* cited by examiner

[FIG. 1]
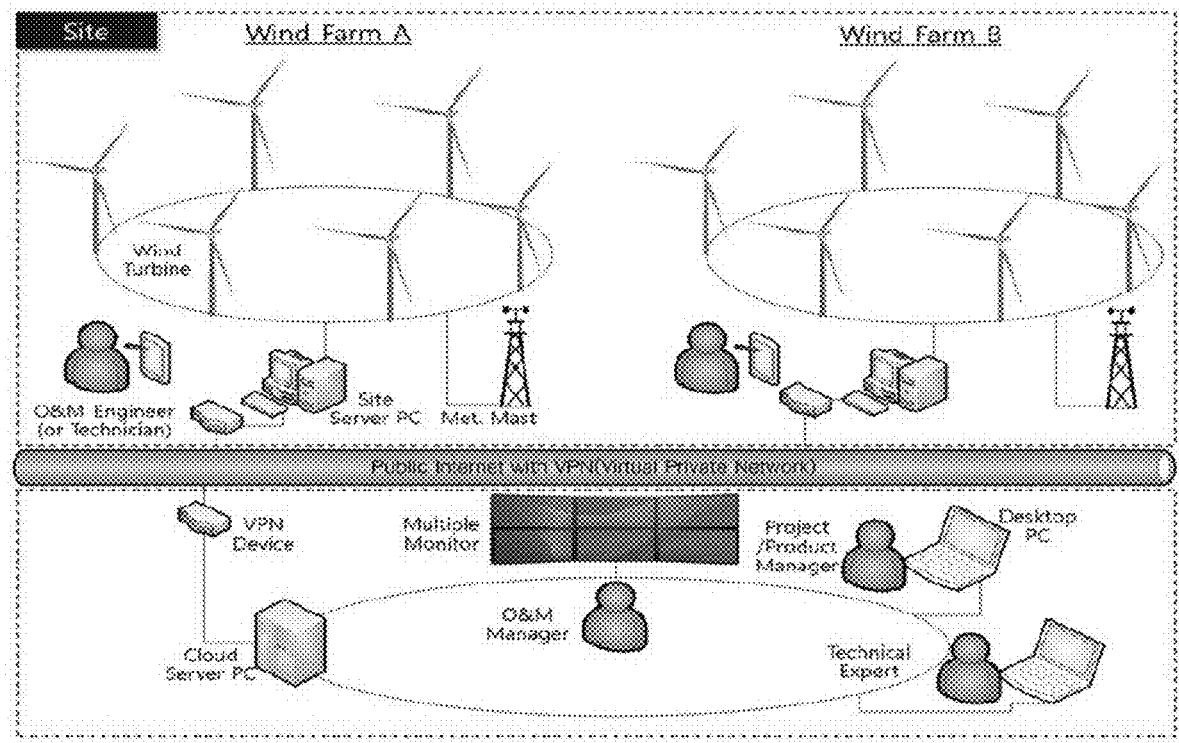
[FIG. 4]
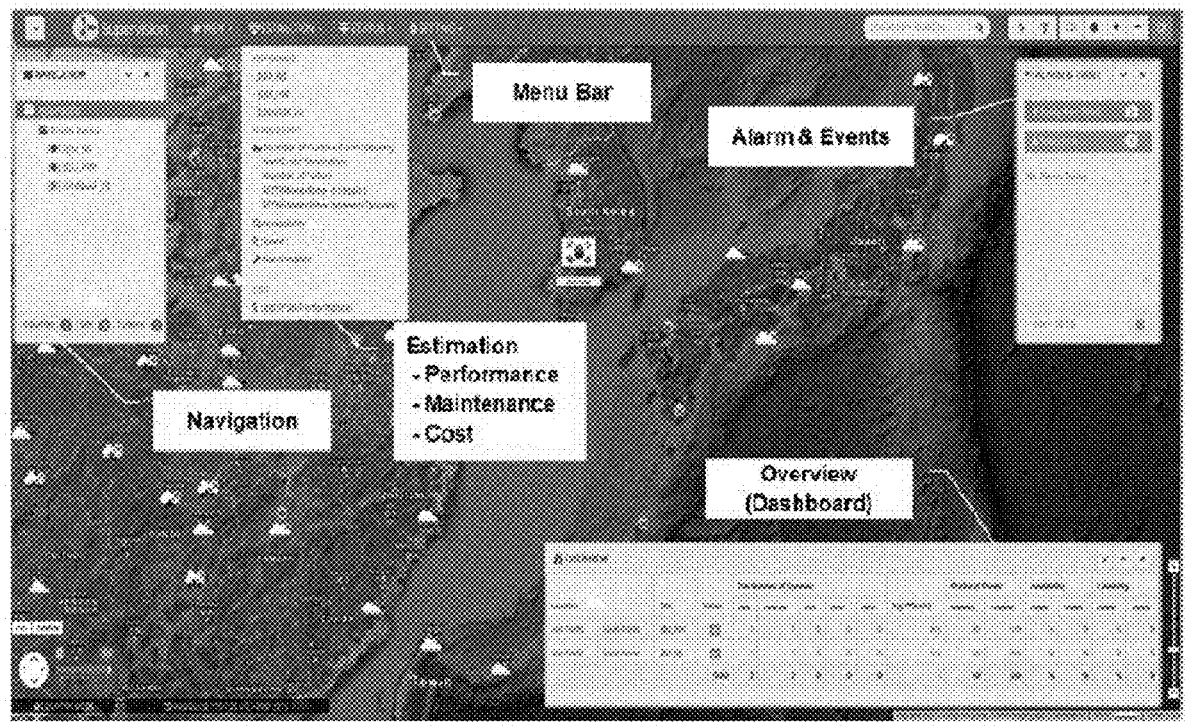

[FIG. 12]
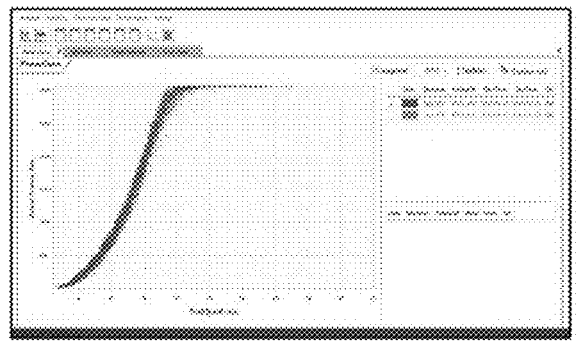
(a) Power Curve
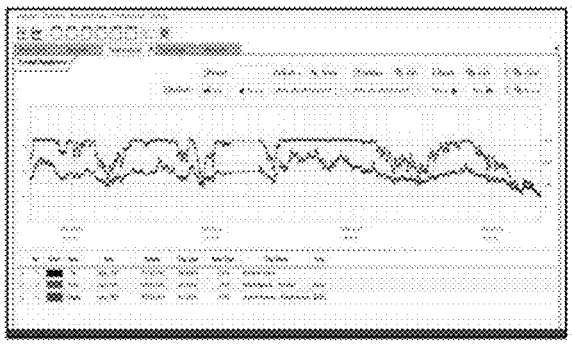
(b) SCADA, CMS Trend
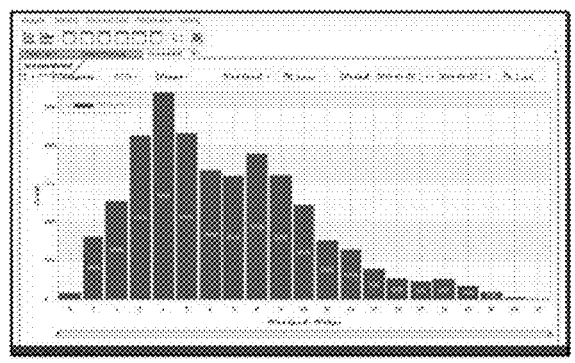
(c) Accumulated Histogram
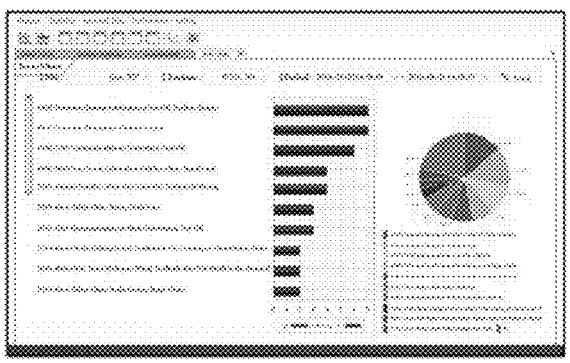
(d) Error Occurred Number
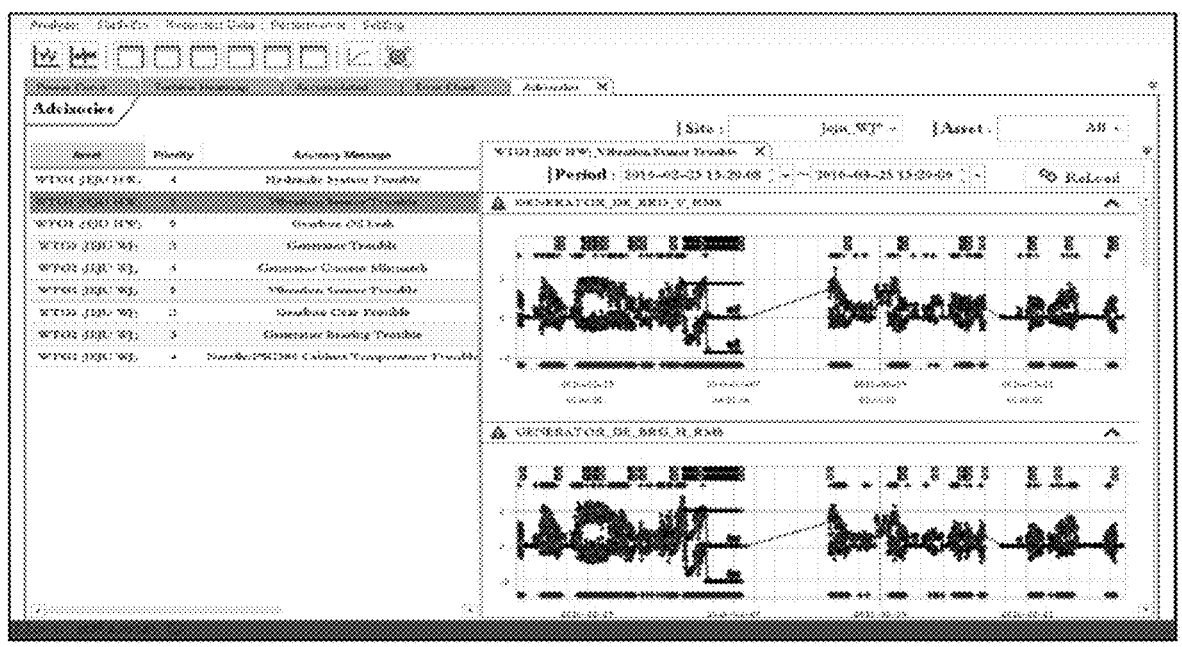
(e) Abnormality Detection

[FIG. 13]
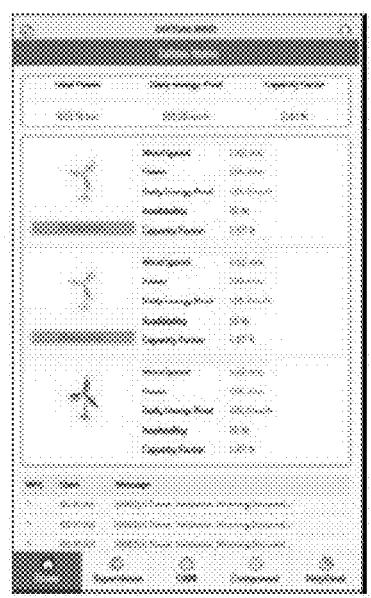
(a) OPERATION STATUS
(b) WORK HISTORY
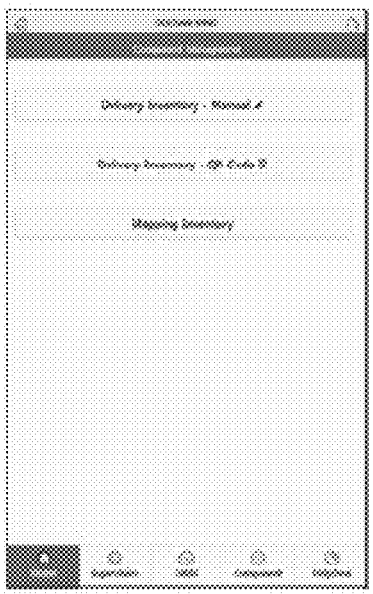
(c) COMPONENT WAREHOUSING
(d) BULLETIN BOARD MESSAGE REGISTRATION

WIND FARM SUPERVISION MONITORING METHOD, OPERATION AND MAINTENANCE PLAN CONTROLLED FROM A MOBILE TERMINAL OF A WORKER AT A REMOTE LOCATION AND USING WORK TICKETS

CROSS-REFERENCE TO RELATED APPLICATION(S)

This application claims priority from Korean Patent Application No. 10-2016-0068879 filed on Jun. 2, 2016, in the Korean Intellectual Property Office, the disclosure of which is incorporated herein by reference in its entirety.

BACKGROUND

1. Field

Methods consistent with exemplary embodiments relate to a wind farm supervision monitoring method, and more particularly, to a wind farm supervision monitoring method capable of performing operation and maintenance for managing at least one wind farm.

2. Description of the Related Art

Recently, due to a depletion of fossil energy and environmental problems such as a climate change and a reduction of greenhouse gas, investment in new renewable energy has been increased and a demand for energy generated by a wind turbine has also been increased globally.

As such, with the spread of wind turbines, 3.4% of global power consumption in 2014 is produced by wind turbines. In 2019, it is expected that the global power consumption produced by wind turbines will reach 5.3%.

By the way, unlike thermal power plant or nuclear power plant facilities, the wind turbine has a plurality of facilities widely distributed over power generation capacity and is affected by accessibility according to a weather condition, a supply and demand of parts and equipment, the number of workers, or the like when operation and maintenance (O & M) is performed, and therefore the wind turbine is provided a facility that is difficult to manage.

In particular, in the case of offshore wind generation, because an access to the wind turbine is limited due to a wind speed and a wave height when the wind turbine breaks down, it is essential to establish an O & M plan for early detecting a breakdown of parts and preventing a critical accident to save the O & M costs.

Recently, an information communication technology (ICT) has been developed toward a problem solution by cooperative work, a trend analysis based on analysis of big data, digital interaction and convergence, preference of easy-to-use thing, or the like.

Further, foreign advanced wind turbine makers use the ICT to manage a wind facility and construct an ICT system to maximize an operating ratio of a wind farm and minimize the O & M costs.

Therefore, there is a need to construct a differentiated monitoring system capable of providing information that manages an alarm and an event of several wind turbines and establishes an operation and maintenance plan by using an ICT technology.

RELATED ART DOCUMENT

Patent Document

Korean Patent No. 1294343 (Registered Date: Jul. 31, 2013)

SUMMARY

One or more exemplary embodiments provide a wind farm supervision monitoring method capable of minimizing an influence of accessibility according to a weather condition, a supply and demand of parts and equipment, the number of workers, or the like when operation and maintenance (O & M) for managing at least one wind farm is performed.

One or more exemplary embodiments also provide a wind farm supervision monitoring method capable of providing information for managing an alarm and an event of several wind turbines and establishing an operation and maintenance plan by acquiring data from a plurality of wind farms based on a management control data acquisition (SCADA) and a status monitoring system (CMS), sharing a turbine operation status, an operation and maintenance plan and record, customer's requirements, or the like on a web, and performing a cooperative work to early detect a breakdown of parts and prevent a critical accident.

Aspects and advantages of the exemplary embodiments can be understood by the following description, and become apparent. Also, it is obvious to those skilled in the art to which the instant disclosure pertains that the aspects and advantages of the exemplary embodiments can be realized by the means as claimed and combinations thereof.

In accordance with an aspect of an exemplary embodiment, there is provided a wind farm supervision monitoring method of a wind farm supervision monitoring system for supervising and managing a plurality of wind farms, in which one wind farm includes at least one wind turbine and a site server acquiring (SCADA) data and monitoring (CMS) a status using a management control for each wind turbine, the wind farm supervision monitoring method including: (a) visualizing a location of the site server on a map in a user interface (UI) unit and displaying the location including a dashboard menu, a navigation menu, and an alarm & event menu; (b) collecting, by a data collection unit, data about status monitoring of each wind turbine from the at least one site server; (c) detecting, by an abnormality status detection unit, an abnormality status of each wind turbine based on the data about the status monitoring of each wind turbine and issuing an alarm; and; (d) providing, by a supervision unit, a turbine operation status of each wind turbine using the dashboard menu, managing operation and maintenance, and providing information for establishing an operation and maintenance plan for the detected abnormality status of the wind turbine.

In the step (d), the supervision unit may collect an early alarm, a weather forecast, and component and tool status information using the SCADA data and the CMS data provided from the at least one site server to establish the operation and maintenance plan, automatically issue a work ticket suggesting a direction in which a worker needs to progress based on the established maintenance plan, receive a registration of a work record depending on the work ticket, and perform a cooperative work for the customer request and answer of a helpdesk.

In the step (d), for the operation and maintenance plan, the supervision unit may determine and establish one of a run to failure that performs maintenance after the operation until a major part breaks, periodic maintenance that periodically performs maintenance for a predetermined period, and status based maintenance that acquires a facility status based on a facility diagnosis technology or a status monitoring technology to early detect a fault and tracks the progress to predict the next progress to thereby perform the operation and maintenance at a specific time.

The dashboard menu may include an estimation function, a status function, and a configuration function, the estimation function may include a management function and a cost function, and the status function may include a network function and a repository function.

In the step (d), for the operation and maintenance, the supervision unit may perform a control by a component management menu, a mobile application menu, and a configuration menu.

In the step (d), for the component management menu, the supervision unit may perform a function of inquiring a work history for each part, a component status, a manual, a report card, and a term of guarantee and confirming a location of a component.

In the step (d), for the mobile application menu, the supervision unit may provide a supervision, operation and maintenance (O & M), and helpdesk functions so that a mobile terminal confirms an operation status of the wind turbine.

In the step (d), for the configuration menu, the supervision unit may provide a location function of adding, modifying, and deleting information on an area, a country, a site, and a turbine.

The component management menu may manage new warehousing and shipping, a turbine model, and a components status and may include inventory management, turbine management, database (DB) management, and setting management.

The helpdesk function may display latest writings of each bulletin board on a home screen in a card and list form and perform a unified search thereon and includes an official announcement menu, a frequently asked questions (FAQ) menu, a customer support menu, the report menu, and a setting menu.

In the step (d), for the operation and maintenance, the supervision unit may set a default period for a plurality of sites, readjust the set period depending on the location and availability of required components and a weather condition, and select an operation and maintenance work that mainly happens at each site.

In the step (d), for the operation and maintenance, the supervision unit may provide an interface for issuing the work ticket provided through the mobile terminal or an interface for writing the work ticket issued through the mobile terminal.

In the step (d), for the operation and maintenance, the supervision unit may visually provide the term of guarantee of each component or part to easily identify the term of guarantee.

In accordance with an aspect of an exemplary embodiment, there is provided a wind farm supervision monitoring method for supervising and managing a plurality of wind farms, in which a wind farm of the plurality of wind farms includes at least one wind turbine and a site server acquiring data (SCADA) and monitoring a status (CMS) using a management control for each wind turbine, the wind farm supervision monitoring method including: displaying, by a user interface (UI) unit, a location of the site server on a map along with a dashboard menu, a navigation menu, and an alarm & event menu; collecting, by a data collection unit, data about status monitoring of each wind turbine from the site server; detecting, by an abnormality status detection unit, an abnormality status of each wind turbine based on the data about the status monitoring of each wind turbine and issuing an alarm based on the detecting the abnormality status; providing, by a supervision unit, a turbine operation status of each wind turbine using the dashboard menu, managing operation and maintenance; and establishing, by the supervision unit, an operation and maintenance plan for the detected abnormality status of the wind turbine.

In the establishing the operation and maintenance plan, the supervision unit is configured to collect an early alarm, a weather forecast, and component and tool status information using the SCADA data and the CMS data provided from the at least one site server to establish the operation and maintenance plan, configured to automatically issue a work ticket suggesting a direction in which a worker needs to progress based on the established maintenance plan, configured to receive a registration of a work record depending on the work ticket, and configured to perform a cooperative work for the customer request and answer of a helpdesk.

In the providing the turbine operation status, for the operation and maintenance plan, the supervision unit is configured to determine and establish one of a run to failure which performs maintenance after the operation until a part of the wind turbine breaks, a periodic maintenance which periodically performs maintenance for a predetermined period, and a status-based maintenance which acquires a facility status based on a facility diagnosis technology or based on a status monitoring technology for an early detection of a fault and which tracks a progress of the worker to predict a subsequent progress required to perform operation and maintenance at a specific time.

It is to be understood that both the foregoing general description and the following detailed description of the present disclosure are exemplary and explanatory and are intended to provide further explanation of the inventive concept as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects, features and other advantages of the disclosure will be more clearly understood from the following detailed description taken in conjunction with the accompanying drawings, in which:

FIG. 1 is a conceptual diagram schematically illustrating a basic configuration of a wind site to which a wind farm supervision monitoring system according to an exemplary embodiment is applied;

FIG. 4 is a diagram illustrating an example in which locations of each site are visually displayed on a map using a user interface unit according to an exemplary embodiment;

FIGS. 12A to 12E are diagrams illustrating an example of information provided by a data management function according to an exemplary embodiment; and FIGS. 13A to 13D are diagrams illustrating an example of providing a turbine operation status within a wind farm to a mobile device, according to an exemplary embodiment.

DETAILED DESCRIPTION

Figure 2:
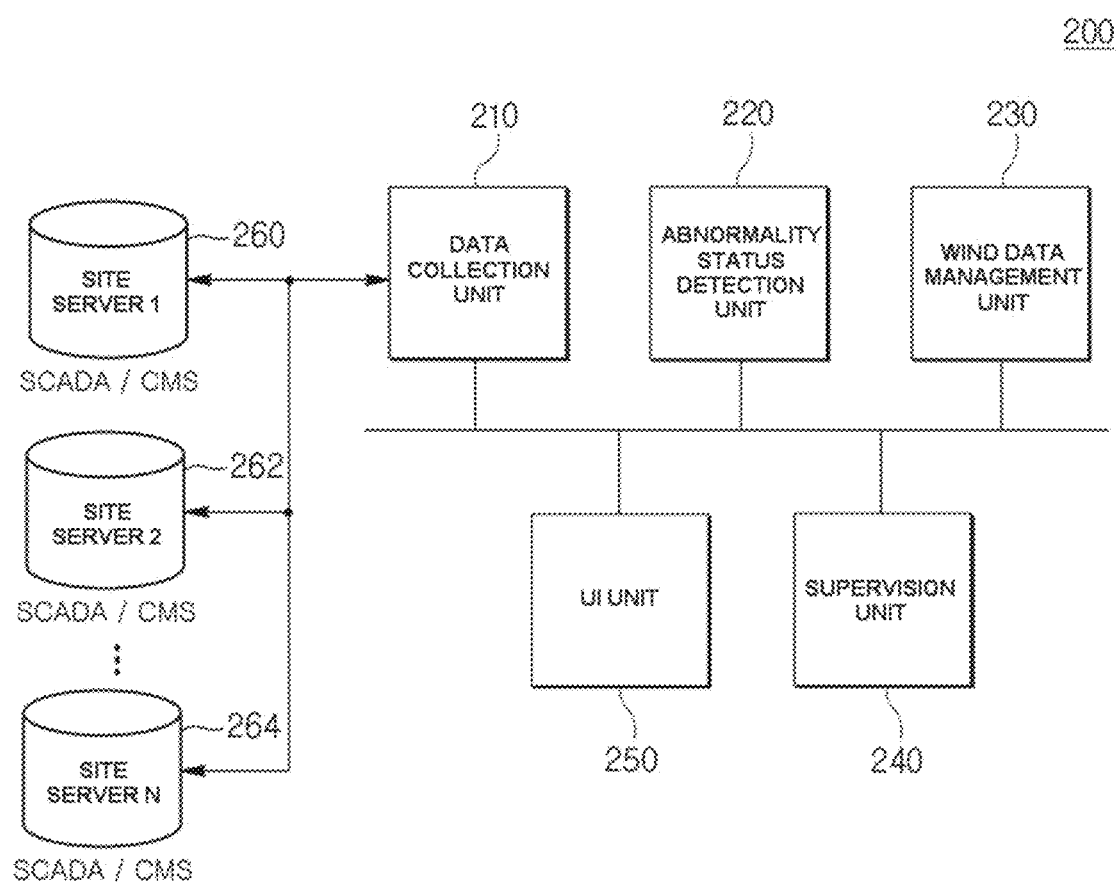
FIG. 2 is a diagram schematically illustrating the whole configuration of the wind farm supervision monitoring system according to an exemplary embodiment.

Hereinafter, exemplary embodiments will be described in detail with reference to the accompanying drawings so that those skilled in the art may easily practice the exemplary embodiments. As those skilled in the art would realize, the described exemplary embodiments may be modified in various different ways, all without departing from the spirit or scope of the inventive concept.

A part irrelevant to the description will be omitted to clearly describe the inventive concept, and the same elements will be designated by the same reference numerals throughout the specification.

In addition, throughout the present specification, when any one part is referred to as being "connected to" another part, it means that any one part and another part are "directly connected to" each other or are "electrically connected to" each other with the other part interposed therebetween. In addition, unless explicitly described to the contrary, "comprising" any components will be understood to imply the inclusion of other elements rather than the exclusion of any other elements.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. can be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present invention.

Terminologies used herein are to mention only a specific exemplary embodiment, and does not limit the present invention. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments so as to be easily practiced by a person skilled in the art to which the present disclosure pertains will be described in detail with reference to the accompanying drawings. However, the present disclosure may be modified in various different ways and is not limited to exemplary embodiments provided in the present description.

FIG. 1 is a conceptual diagram schematically illustrating a basic configuration of a wind site to which a wind farm supervision monitoring system according to an exemplary embodiment is applied.

As illustrated in FIG. 1, in the wind farm supervision monitoring system according to an exemplary embodiment, one site includes a plurality of wind farms A and B 110 and 120, in which each wind farm includes at least one wind turbine 111 and 121, Met. Masts 112 and 122, and site servers 113 and 123 that acquire SCADA data from the at least one wind turbine 111 and 121 by a management control and monitor a status of each wind turbine (CMS).

Site servers 113 and 123 monitoring each wind farm may be connected to a cloud server 140, personal computers (PCs) 150 and 160, or the like through a public internet 130 in which a virtual private network (VPN) is configured.

A multiple monitor 170 may be connected to the cloud server 140. An O & M manager 181 may monitor an operation status of each wind turbine 111 and 121 through the multiple monitor 160 and project/product managers 183 and technical experts 185 may manage the operation of the wind turbine 111 and 121 using the personal computers 150 and 160.

That is, the wind farm supervision monitoring system according to the exemplary embodiment acquires data from the wind turbine 111 and 121, the Met. Mast 112 and 122, and the O & M engineer 187 and stores the acquired data in the site server 113 and 123 and the cloud server 140. The O & M engineer 187, the O & M manager 181, the project/product manager 183, and the technical expert 185 share a turbine operation status, an operation and maintenance plan and record, customer's requirements, or the like on a web and perform a cooperative work to solve an abnormality status of the wind turbine 111 and 121 and establish the operation and maintenance plan.

FIG. 2 is a diagram schematically illustrating the whole configuration of the wind farm supervision monitoring system according to an exemplary embodiment.

Referring to FIG. 2, a wind farm supervision monitoring system 200 according to an exemplary embodiment includes a data collection unit 210, an abnormality status detection unit 220, a wind data management unit 230, a supervision unit 240, and a user interface (UI) unit 250.

The data collection unit 210 collects data about status monitoring of each wind turbine from at least one site server 260 to 264. Here, the data collection unit 210 may set special conditions, for example, conditions on how fast a wind speed is, which direction a wind direction is, whether an outside situation corresponds to a specific condition, or the like and may collect data only when the wind turbine corresponds to the setting.

The abnormality status detection unit 220 detects the abnormality status of each wind turbine based on the collected data about the status monitoring of each wind turbine and issues an alarm.

The wind data management unit 230 may early detect a fault of each wind turbine or monitor performance of each wind turbine, based on the data about the status monitoring of each wind turbine provided from at least one site server 260 to 264 or the data about the abnormality status of each wind turbine detected by the abnormality status detection unit 220.

The supervision unit 240 may manage a turbine operation status and operation and maintenance of each wind turbine and provide information for establishing an operation and maintenance plan for the detected abnormality status of the wind turbine.

Figure 3:
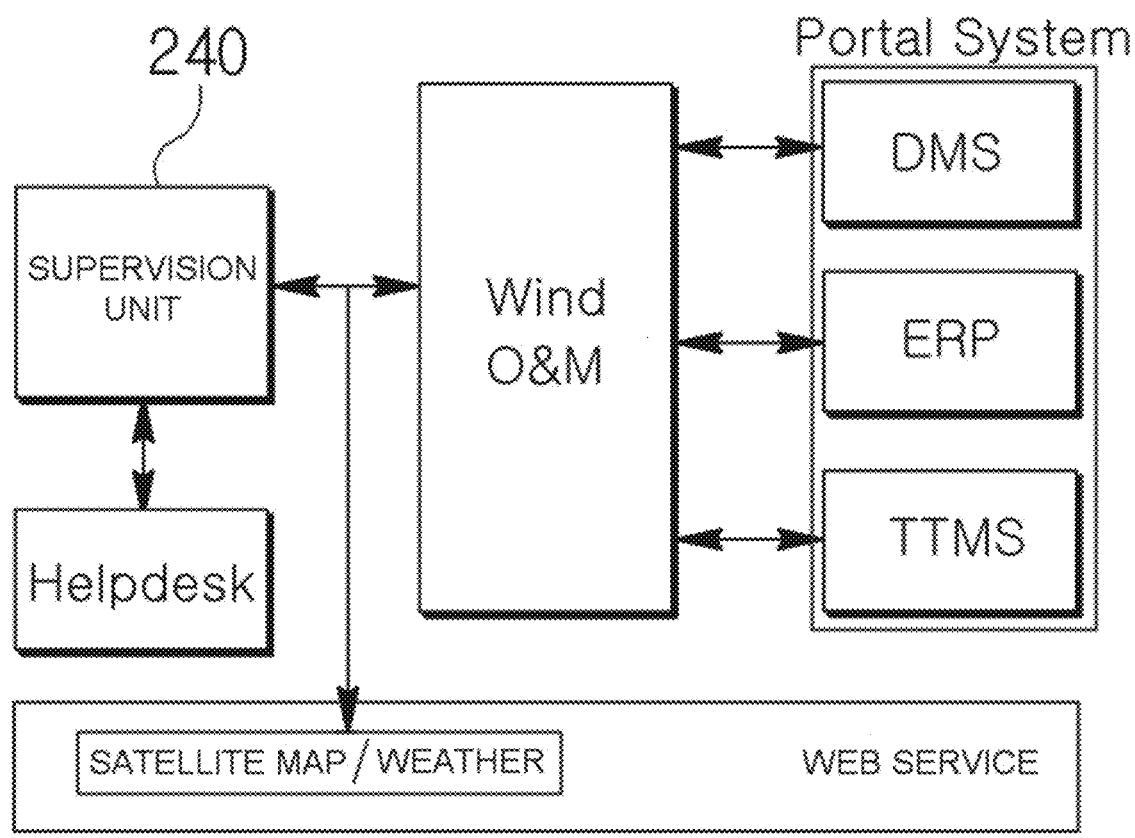
FIG. 3 is a diagram illustrating an example in which wind O & M management according to an exemplary embodiment is performed by being linked with a portal system.

Further, for the wind operation and maintenance (O & M), as illustrated in FIG. 3, the supervision control unit 240 may be linked with a portal system that includes a document management system (DMS) 310, an enterprise resource planning (ERP) 320 system, and a tool total management system (TTMS) 330 to perform components management, a work plan and record, a cooperation of an on-site work problem, and tool management.

FIG. 3 is a diagram illustrating an example in which wind O & M management according to an exemplary embodiment is performed by being linked with a portal system. As illustrated in FIG. 3, the supervision unit 240 may provide a satellite map or weather forecast information through a web service. Further, in FIG. 3, the supervision unit 240 may mainly provide a customer's question and answer function through a helpdesk menu 340.

As illustrated in FIG. 4, the user interface unit 250 visually displays locations of each site for at least one wind farm and may display a live turbine operation status, an operating ratio, and utilization of each wind turbine by a dashboard menu 410. FIG. 4 is a diagram illustrating an example in which locations of each site are visually displayed on a map using a user interface unit according to an exemplary embodiment. In FIG. 4, the user interface unit 250 may display the information on each wind farm by a navigation menu 420. In FIG. 4, the user interface unit 250 may display a turbine error of each wind turbine, an early alarm, a work history, and a helpdesk function by an alarm & event menu.

Further, the user interface unit 250 may display a kind of information exposed as a default on the interface screen of FIG. 4 and display the information exposed as the default on a plurality of independent windows.

Figure 5:
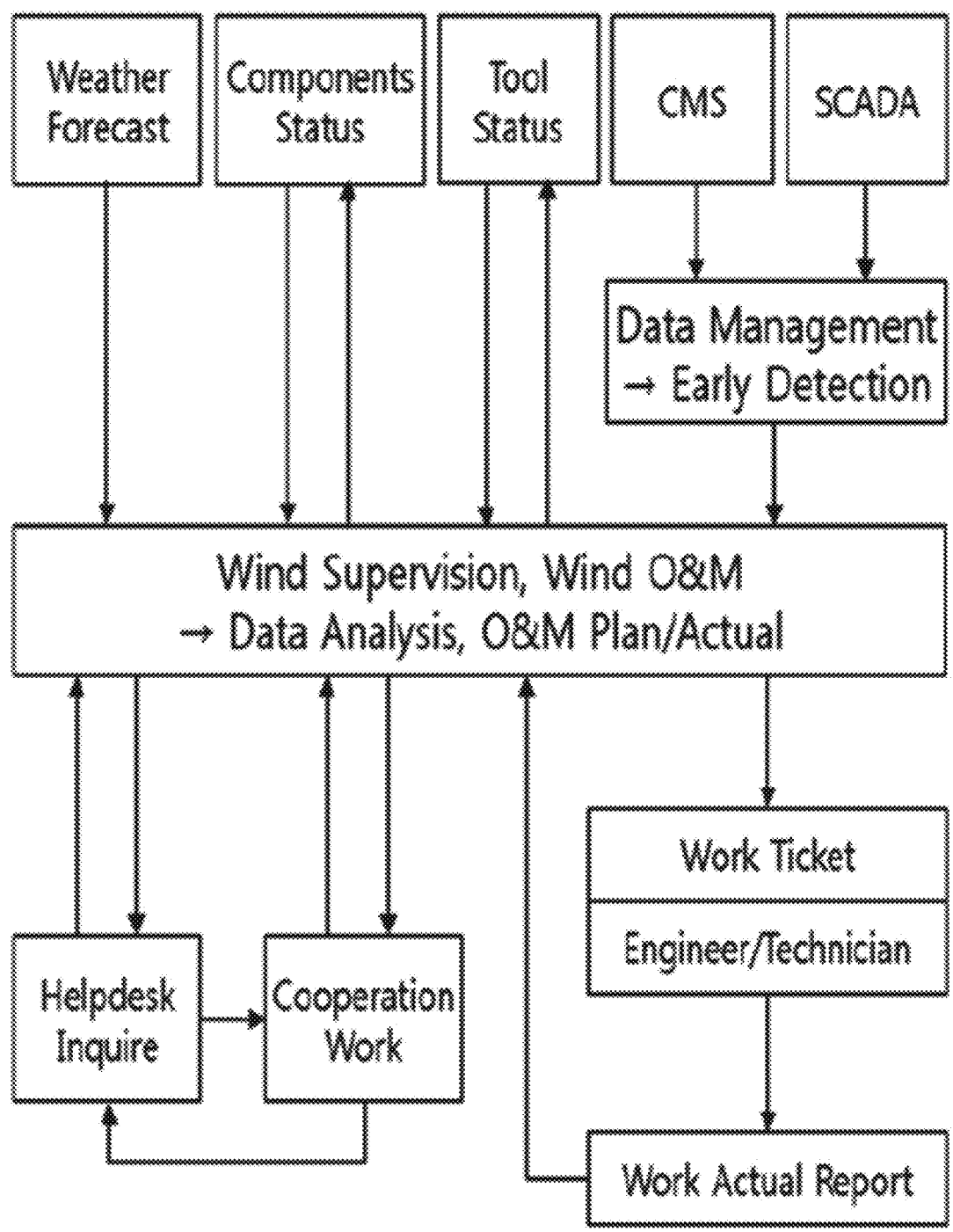
FIG. 5 is a diagram illustrating wind supervision and operation and maintenance (O & M) according to an exemplary embodiment.

Meanwhile, for the wind supervision and the wind operation and maintenance, as illustrated in FIG. 5, the supervision unit 240 collects the SCADA data and the CMS data provided from at least one site server 260 to 264 to early detect the abnormality status using data management. FIG. 5 is a diagram illustrating wind supervision and operation and maintenance (O & M) according to an exemplary embodiment. In FIG. 5, the supervision unit 240 may collect information on a weather forecast, a components status, and a tool status to establish O & M plan/actual. Further, the supervision unit 240 may automatically issue a work ticket suggesting a direction in which a worker may be performed depending on the established O & M plan/actual to an engineer and/or technician and receive a registration of a work record depending on the work ticket. In addition, the supervision unit 240 may perform a customer inquire of a helpdesk and a cooperative work for an answer.

Further, for the wind O & M, the supervision unit 240 performs functions about component/spare management, work plan/actual, cooperative work, manual/guarantee status management, tool/equipment management, and helpdesk reply of each wind turbine.

Further, for the O & M plan, the supervision unit 240 may determine one of a run to failure that performs maintenance after the operation until a major part breaks, periodic maintenance that periodically performs maintenance for a predetermined period, and status based maintenance that acquires a facility status based on a facility diagnosis technology or a status monitoring technology to early detect a fault and tracks the progress to predict the next progress to thereby perform the operation and maintenance at a specific time, thereby establishing the operation and maintenance plan.

Figure 6:
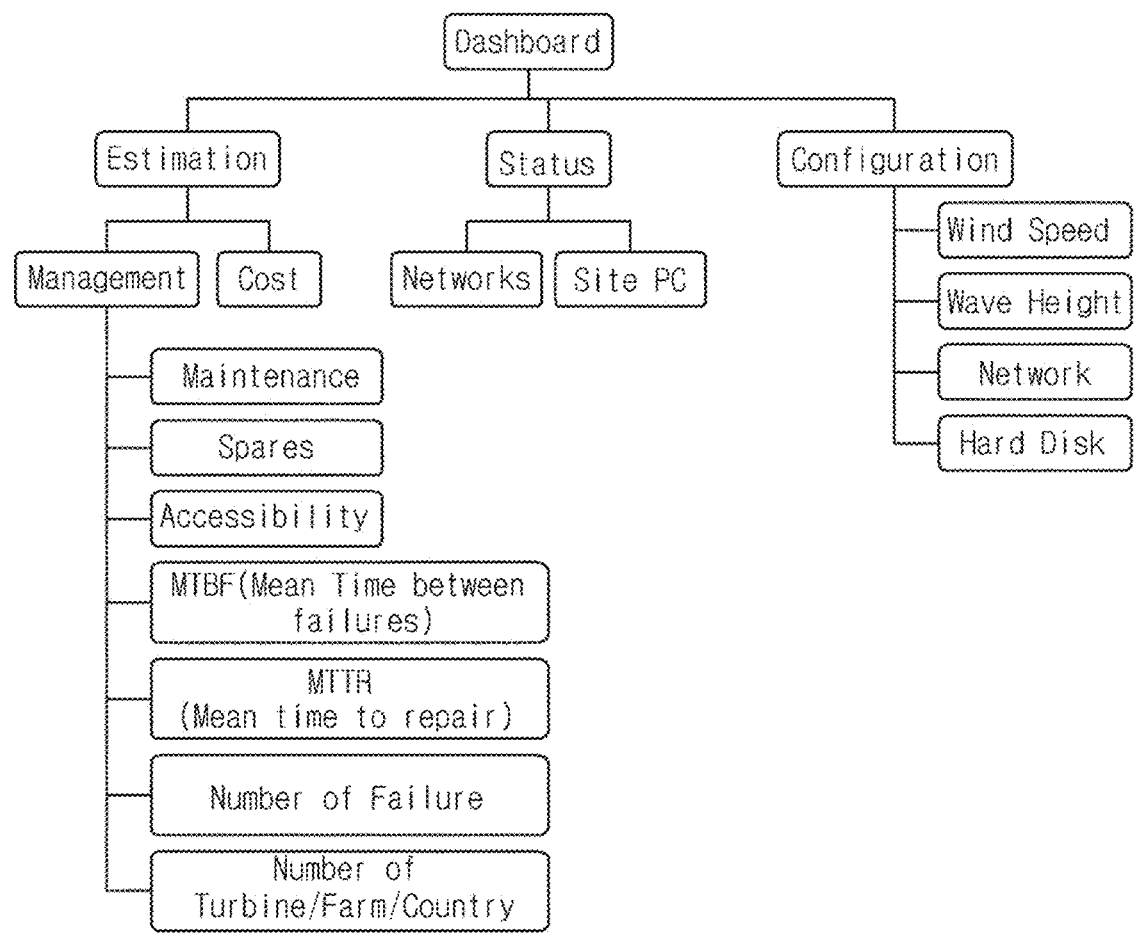
FIG. 6 is a diagram illustrating a functional configuration of a dashboard menu displayed on a user interface screen according to an exemplary embodiment.

Meanwhile, the dashboard menu illustrated in FIG. 4 provides a composite dashboard for the site and the turbine and as illustrated in FIG. 6, may include an estimation function, a status function, and a configuration function. FIG. 6 is a diagram illustrating a functional configuration of a dashboard menu displayed on a user interface screen according to an exemplary embodiment. In FIG. 6, the estimation function includes a management function and a cost function, the status function includes a network function and a site PC function, and the configuration function includes a wind speed, a wave height, a network/server, and a hard disk, such that priority and a threshold value of equipment may be set.

Further, the dashboard menu may provide a country, a site, and information on each turbine depending on the navigation and alarm, an overview panel, and a zoom level of a map.

Further, in the dashboard menu of FIG. 6, the management function may include a status about the number of turbines, the number of wind farms, the number of countries, the number of failures, mean time to repair (MTTR), and mean time between failure (MTBF), accessibility to each site, spares by site, and periodic maintenance for each turbine.

Figure 7:
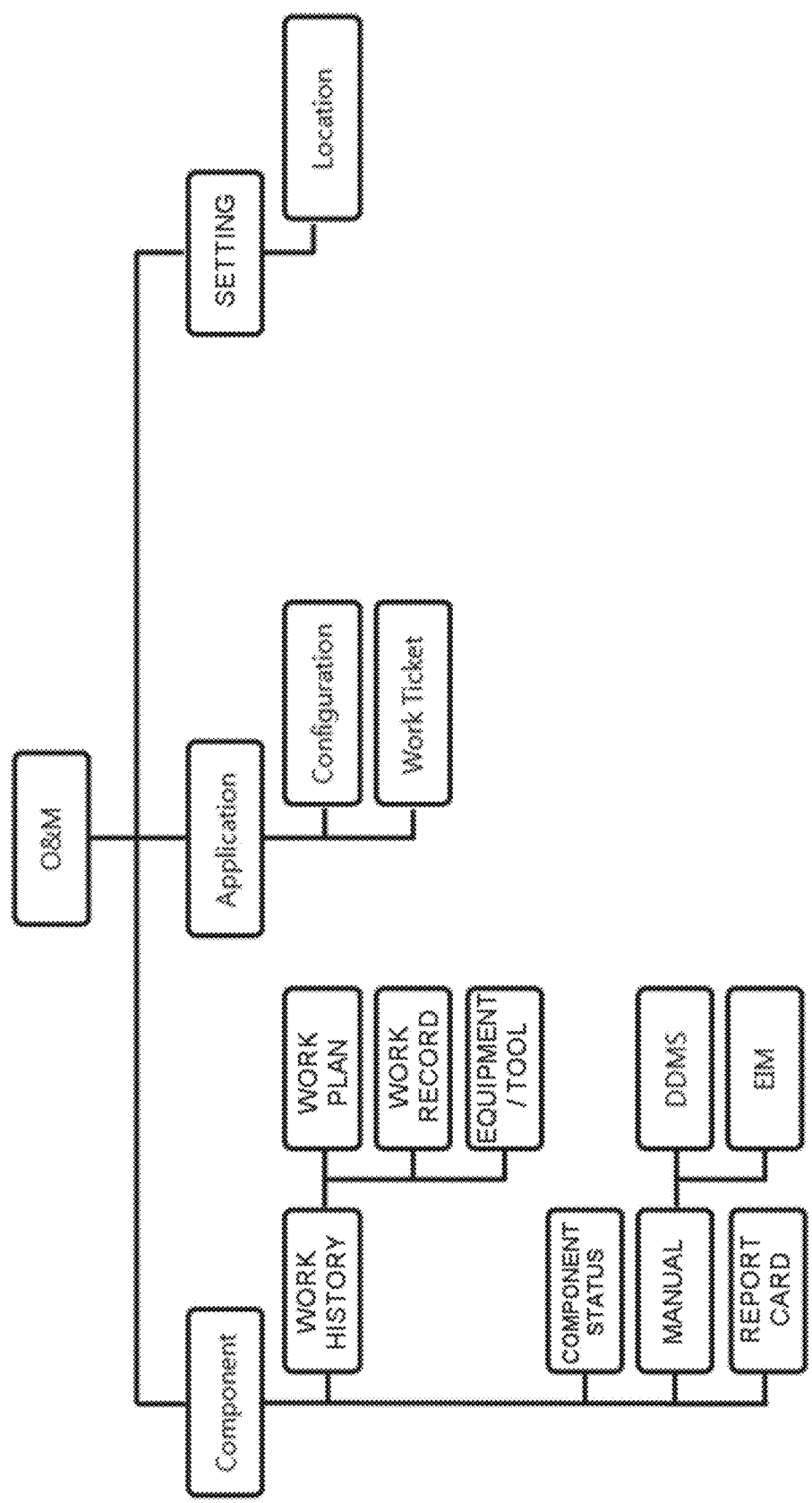
FIG. 7 is a diagram illustrating a detailed menu example of an operation & maintenance menu according to an exemplary embodiment.

Meanwhile, for the operation and maintenance, as illustrated in FIG. 7, the supervision unit 240 may perform a control by a component management menu, a mobile application menu, and a configuration menu. FIG. 7 is a diagram illustrating a detailed menu example of an operation & maintenance menu according to an exemplary embodiment.

In FIG. 7, for the component management menu, the supervision unit 240 may perform a function of inquiring the work history for each component, the components status, a manual, a report card, and a term of guarantee and confirming the location of components.

Further, for the mobile application menu, the supervision unit 240 may provide the functions of the supervision, the O & M, and the helpdesk so that a mobile terminal may confirm the operation status of the wind turbine and for the configuration menu, the supervision unit 240 may provide a location function of adding, modifying, and deleting information on an area, a country, a site, and a turbine.

Here, for plan maintenance, corrective maintenance, and prediction maintenance, the work history may include a work plan function of inquiring and registering a work plan, a work record function of inquiring a work record input to the issued work ticket, and an equipment tool function of inquiring equipment and tool used for work.

Further, the components status may inquire an inventory status of a spare part for each site and request a purchase and delivery for components, the manual may include a DDMS function of registering and inquiring a distributed database management system (DDMS) document and an EIM function of registering and inquiring an enterprise information management (EIM) document, and the report card and the term of guarantee may include a function of inquiring a report card and a term of guarantee of parts.

Further, the mobile application menu may confirm the operation status of the wind turbine using a mobile terminal through the monitoring function and allow an in-house staff or a worker of a cooperative firm to register a work record using a mobile terminal when the work ticket is issued through the O & M function and register questions or issue matters of the turbine and write history management using a mobile terminal through the helpdesk function.

Figure 8:
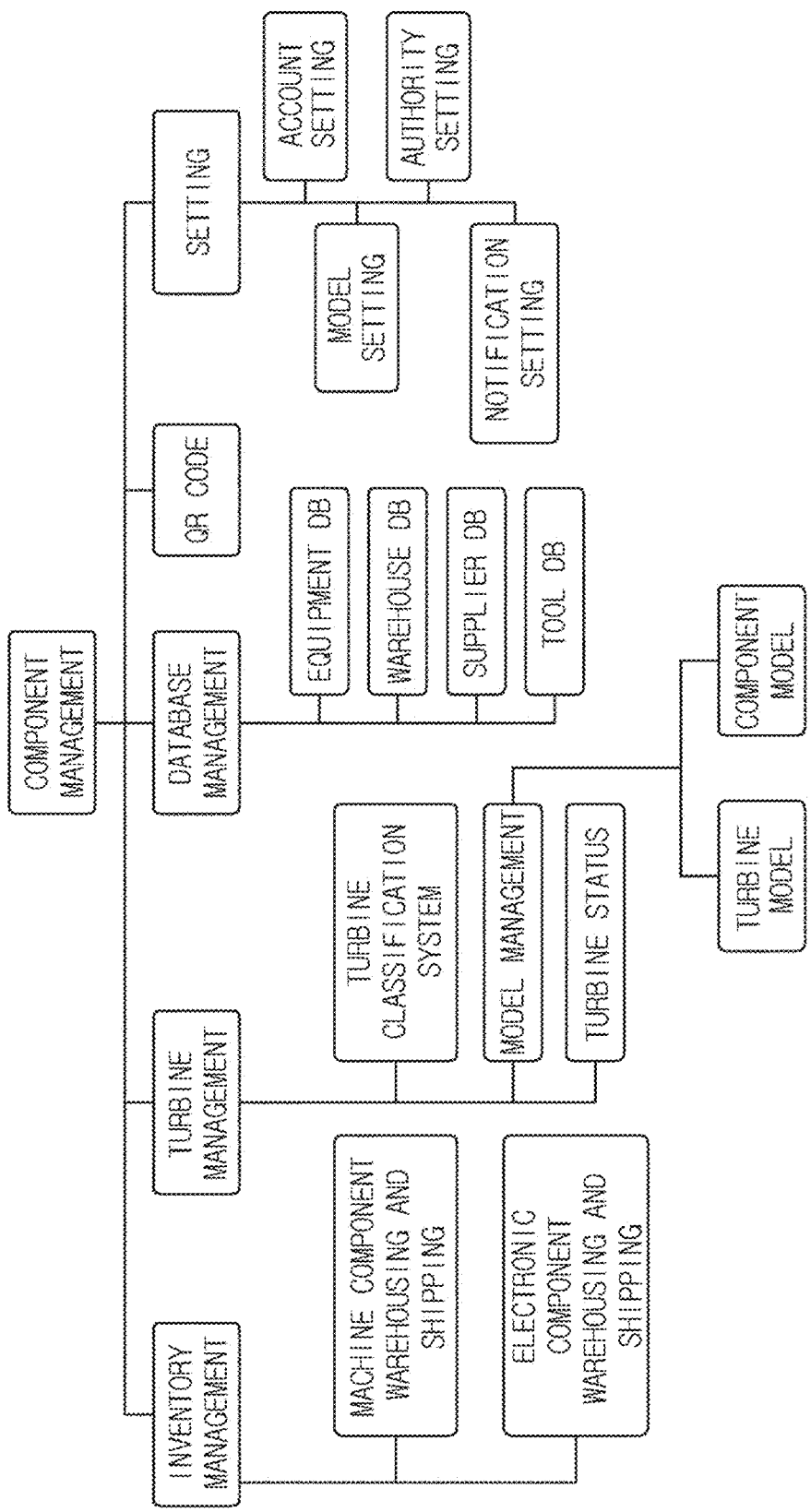
FIG. 8 is a diagram illustrating a function of managing parts according to an exemplary embodiment.

Meanwhile, the component management menu is to manage new warehousing and shipping, a turbine model, and a components status and as illustrated in FIG. 8, may include inventory management, turbine management, database (DB) management, QR code management, and setting management. FIG. 8 is a diagram illustrating a function of managing parts according to an exemplary embodiment.

In FIG. 8, the inventory management may include a machine component warehousing and shipping function of inquiring a warehousing and shipping history of a machine component and an electronic component warehousing and shipping function of inquiring a warehousing and shipping history of an electronic component.

Further, the turbine management may perform the turbine classification system function of inquiring the turbine classification system based on the model management menu, the turbine model function of adding, modifying and inquiring the turbine model, and the component model function of adding, modifying, and inquiring the component model and may inquire the turbine status based on the turbine status menu.

Further, the DB management may add, modify, and inquire the equipment information using the equipment DB menu, add, modify, and inquire the component warehouse information using the warehouse DB menu, add, modify, and inquire the supplier information using the supplier DB menu, or add, modify, and inquire the tool information using the tool DB menu.

Further, the setting management may include a model setting menu for managing model setting, a notification setting menu for setting items to be notified through e-mail and SMS, an account setting menu for managing an account of a component management user, and an authority setting menu for setting authority for the component management user.

Further, as illustrated in FIG. 8, the component management menu may include a QR code menu for managing QR code information input from a cooperative firm and providing a user interface (UI) that may issue the QR code.

Further, the mobile application menu may recognize the shipping information when the components are shipped from a cooperative firm and inputs the recognized shipping information to a database through a mobile terminal and may connect the previously input component information to the turbine of the corresponding site when the turbine is assembled.

Figure 9:
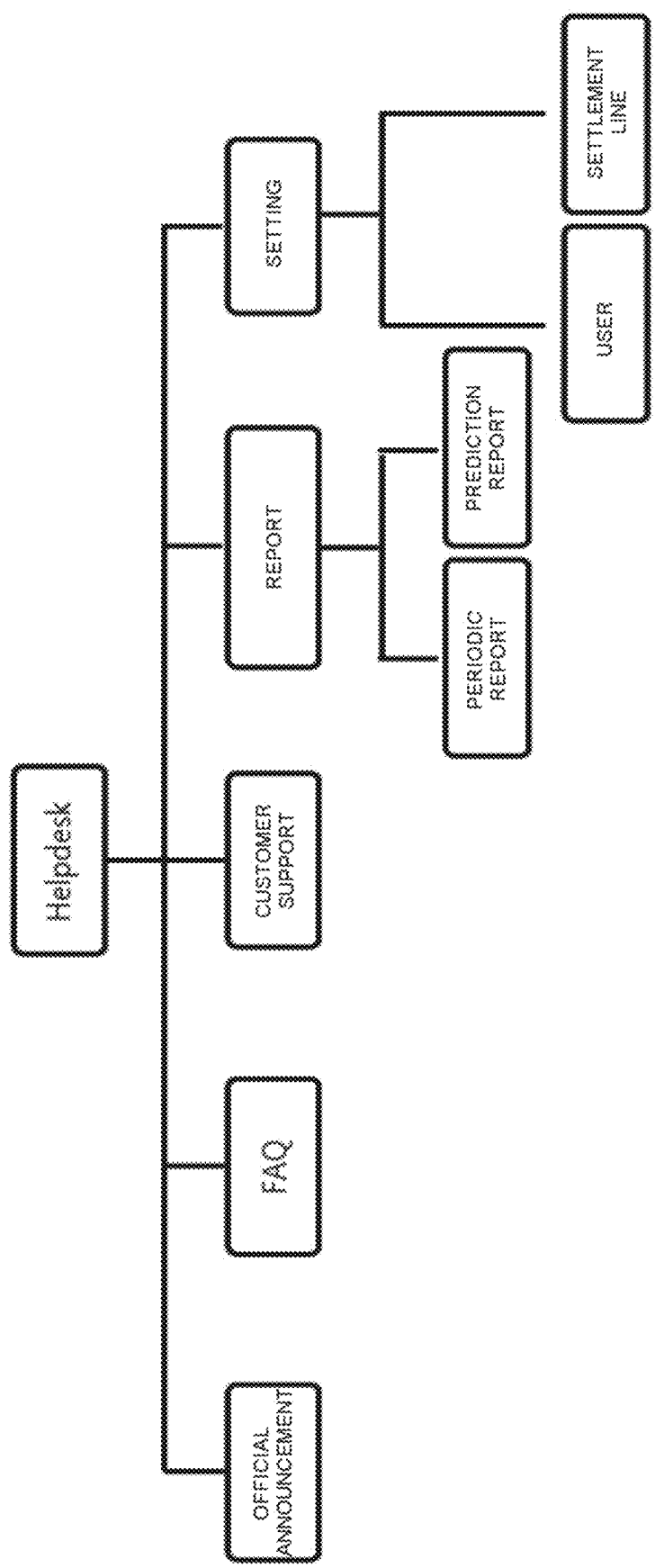
FIG. 9 is a diagram illustrating a configuration of a helpdesk function under the wind supervision according to an exemplary embodiment.

Meanwhile, the helpdesk function of FIG. 3 is to display latest writings of each bulletin board on a home screen in a card and list form and perform a unified search thereon and as illustrated in FIG. 9, may include an official announcement menu, a frequently asked questions (FAQ) menu, a customer support menu, a report menu, and a setting menu. FIG. 9 is a diagram illustrating a configuration of a helpdesk function under the wind supervision according to the exemplary embodiment.

In FIG. 9, the official announcement menu may allow a manager to register the known writing and may inquire or confirm the official announcement posted by the manager. The frequently asked questions menu may inquire or confirm questions posted by a manager and the customer support menu may post or confirm customer related contents.

Further, the report menu may include a periodic report function of registering, modifying, inquiring a periodic report and a prediction report function of registering, modifying, and inquiring a prediction report and the setting menu may include a user setting function of adding, modifying, and inquiring a helpdesk user or setting authority by user.

Figure 10:
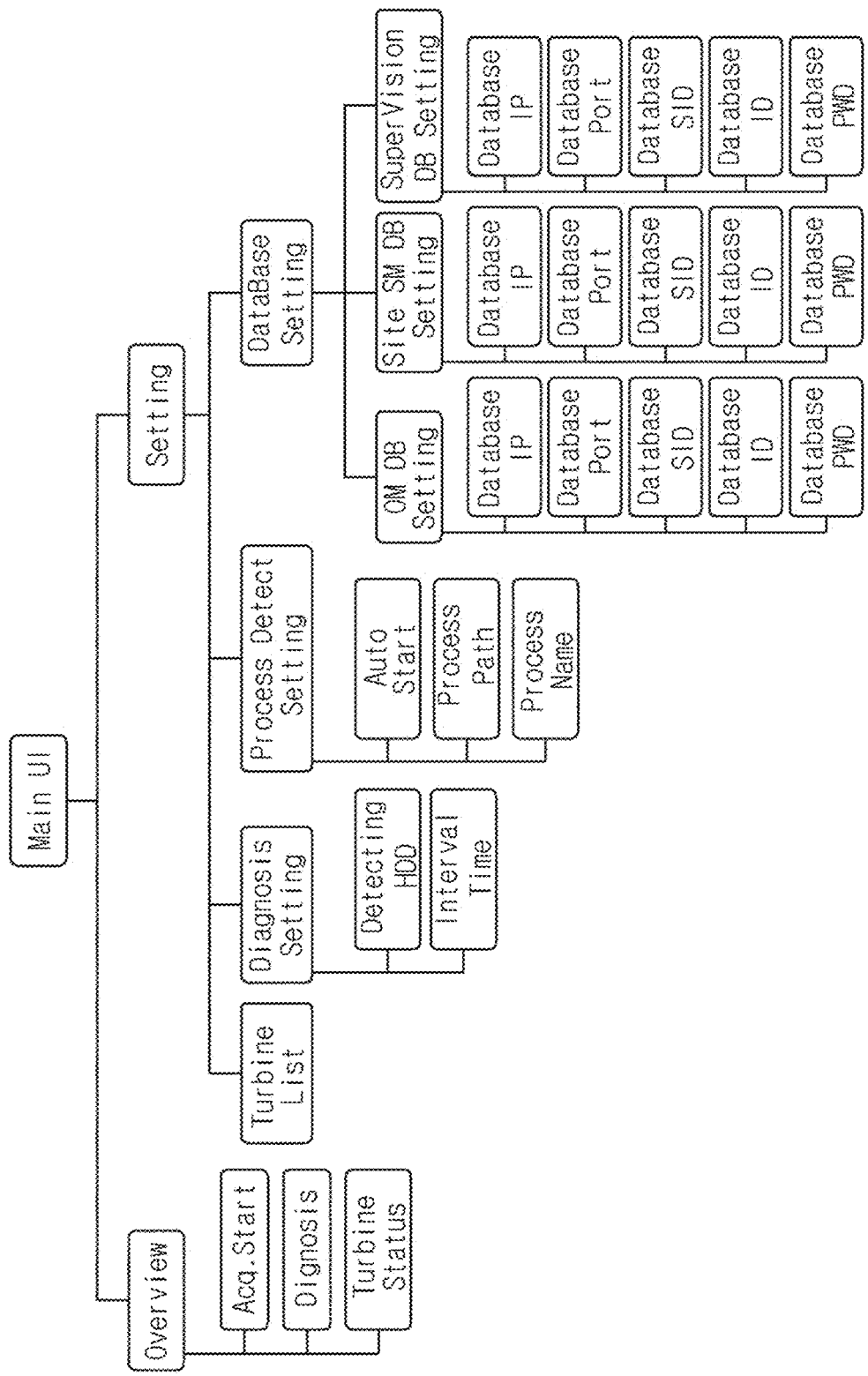
FIG. 10 is a diagram illustrating an example of a user interface menu for automatic diagnosis of a wind turbine according to an exemplary embodiment.

Meanwhile, as illustrated in FIG. 10, the user interface unit 250 may include an overview menu and a setting menu for an auto diagnosis function. FIG. 10 is a diagram illustrating an example of a user interface menu for automatic diagnosis of a wind turbine according to an exemplary embodiment.

In FIG. 10, the overview menu may represent a collection status of the SCADA and CMS data of registered turbines using a turbine status function, represent a live system status using a diagnosis function, or start data-linking with a system monitoring and supervision unit using an acquisition start function.

In FIG. 10, the setting menu may display information of currently registered turbines using a turbine list function.

Further, the setting menu may set an interval time at which a system monitoring item data is transmitted to the supervision unit using a diagnosis setting function.

Further, the setting menu may detect an HDD to select and change a hard disk (HDD) of which the consumed amount needs to be checked.

Further, the setting menu may set the process name that monitors the process operation status using the process detect setting function, set the process path for forcibly and automatically restarting the process, or set the auto start when the operation is not performed during the process monitoring.

Further, the setting menu may set the database access IP address, the database access port number, the database access SID or data source, the database access ID, the database access password using the database setting function.

Meanwhile, a wind data management unit 230 of FIG. 2 may manage a live data menu, a recorded data menu, an analysis menu, a statistics menu, and a performance menu.

Here, the live data menu may display a live data of a turbine and the recorded data menu may display information corresponding to an error photo and an error trace and may display a day counter data, a day counter status data, a total counter data, a total counter status data, and a status message for a PLC status change.

Further, the analysis menu may perform a normal analysis using a trend analysis function, analyze raw data using a time-FFT analysis function, or analyze smart shield data using an early detect function.

Further, the statistics menu may analyze an occurrence frequency of turbines within a wind farm for a specific tag using an accumulated chart function or analyze a change in data in response to a wind direction and locations of four cells using a wind chart function.

Further, the statistics menu may display a heat map chart for confirming weekly average data for a turbine within a wind farm using a turbine heat map chart or analyze each error occurrence frequency of a turbine using an error chart function.

Further, the performance menu may display data of generation in response to a wind speed of a turbine using a power curve function or display data for vibration of a turbine using a vibration function.

Meanwhile, a data collection unit 210 of FIG. 2 may include an overview menu and a setting menu.

The overview menu may display a turbine status currently connected to a PLC using a turbine status function or start a connection to the PLC and an acquisition of data based on the set information using an acquisition start function.

Further, the setting menu may display or modify a turbine list including modbus connection information of the PLC using a turbine information function.

Further, the setting menu may add a turbine or delete (delete turbine) connection information to a turbine selected from the current list.

Further, the setting menu may set (listen IP) an IP of a TCP listener receiving a command for collecting raw data from a data manager using a TCP setting function or set (listen port) an IP port of the TCP listener receiving a command for collecting the raw data from the data manager.

Figure 11:
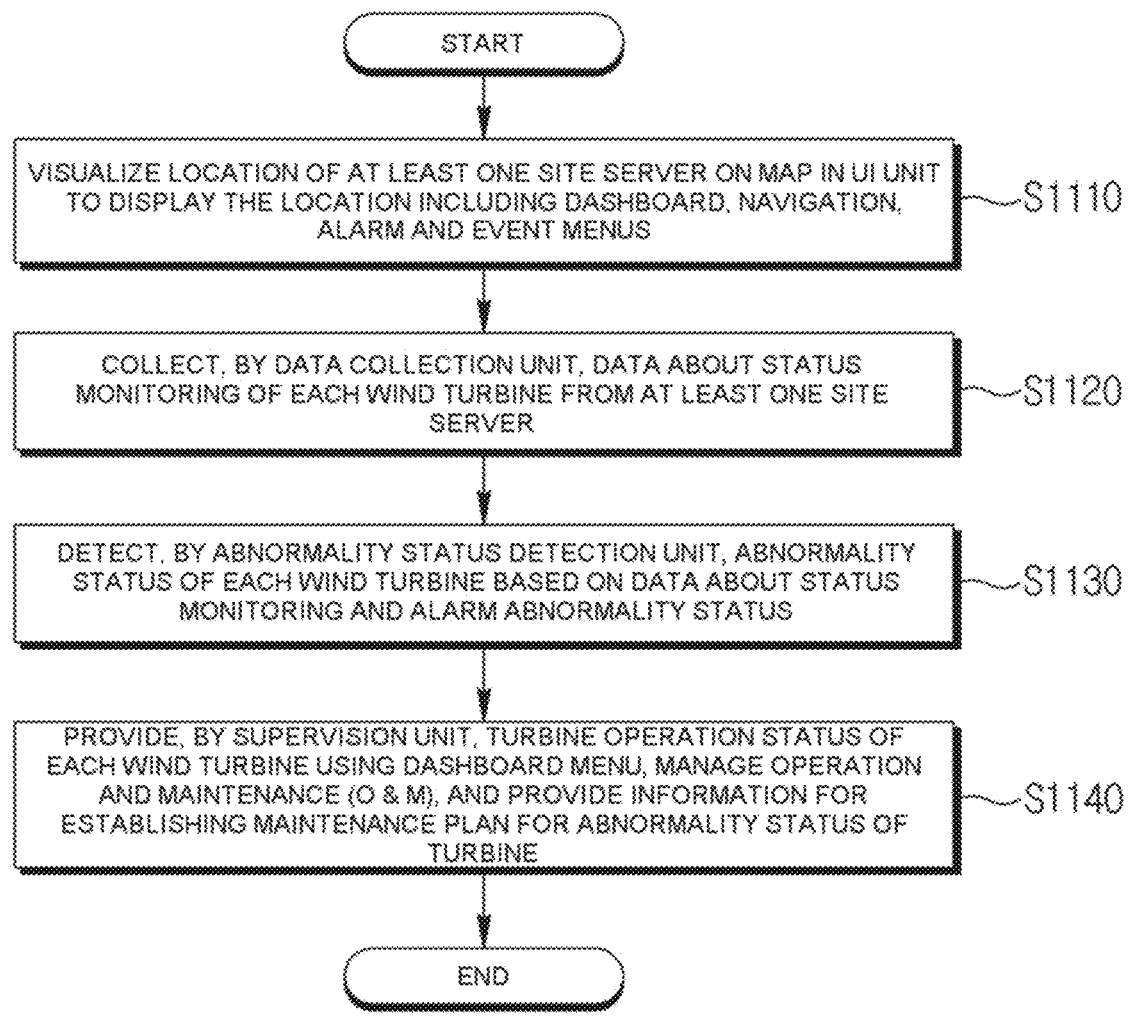
FIG. 11 is a diagram illustrating an operation flow chart for describing a wind farm supervision monitoring method according to an exemplary embodiment.

FIG. 11 is a diagram illustrating an operation flow chart for describing a wind farm supervision monitoring method according to an exemplary embodiment.

Referring to FIG. 11, a wind farm supervision monitoring system 200 according to an exemplary embodiment visualizes locations of at least one server 260 to 264 in the UI unit 250 on a map and displays them including a dashboard menu, a navigation menu, and an alarm & event menu (S1110).

Next, the data collection unit 210 collects data on the status monitoring of each wind turbine from at least one site server (S1120).

Next, the abnormality status detection unit 220 detects an abnormality status of each wind turbine based on the data about the status monitoring of each wind turbine and issues an alarm (S1130).

Next, the supervision unit 240 may manage a turbine operation status and operation and maintenance of each wind turbine using the dashboard menu and provide information for establishing the operation and maintenance plan for the detected abnormality status of the wind turbine (S1140).

In this case, the supervision unit 240 may collect the early alarm, the weather forecast, and the component and tool status information using the SCADA data and the CMS data provided from at least one site server to establish the operation and maintenance plan, automatically issue the work ticket suggesting the direction in which the worker may progress based on the established maintenance plan, receive the registration of the work record depending on the work ticket, and perform the cooperative work for the customer request and answer of the helpdesk.

Further, for the operation and maintenance, the supervision unit 240 may set a default period for a plurality of sites, readjust the set period depending on the location and availability of required components and a weather condition and select an operation and maintenance work that mainly happens at each site.

Further, for the operation and maintenance, the supervision unit 240 may search for the previous information at the time of a future plan based on a plan, a practice, and history management for maintenance personnel and store a moving path of manpower by site as information, thereby performing the management.

Further, for the operation and maintenance, the supervision unit 240 may search for the previous information at the time of a future plan based on a plan, a practice, and history management for components by each site, stores a kind and the number of components required by work that frequently happens, and store a moving path of scattered components by site as information, thereby performing the management.

Further, for the operation and maintenance, the supervision unit 240 may provide an interface for issuing the work ticket provided through the mobile terminal or an interface for writing the work ticket issued through the mobile terminal.

Further, for the operation and maintenance, the supervision unit 240 may visually provide the term of guarantee of each component or part to easily identify the term of guarantee.

Further, for the O & M plan, the supervision unit 240 may determine one of the run to failure that performs maintenance after the operation until the major part breaks, the periodic maintenance that periodically performs maintenance for a predetermined period, and the status based maintenance that acquires a facility status to early detect a fault and tracks the progress and then predicts the progress to perform the operation and maintenance at a specific time, thereby establishing the operation and maintenance plan.

Further, as illustrated in FIG. 6, the dashboard menu includes the estimation function, the status function, and the configuration function, in which the estimation function may include a management function and a cost function and the status function may include a network function and repository function.

Further, the configuration function may set the wind speed, the wave height, and the priority and the threshold value of the equipment including the network/server and the hard disk.

Further, the management function may include a status about the number of turbines, the number of wind farms, the number of countries, the number of failures, the mean time to repair (MTTR), and the mean time between failure (MTBF), the accessibility to each site, the spares by site, and the periodic maintenance for each turbine.

Meanwhile, for the operation and maintenance, as illustrated in FIG. 7, the supervision unit 240 may perform a control by a component management menu, a mobile application menu, and a configuration menu.

For the component management menu, the supervision unit 240 may perform a function of inquiring the work history for each component, the components status, the manual, the report card, and the term of guarantee and confirming the locations of components.

Further, for the mobile application menu, the supervision unit 240 may provide the supervision, operation and maintenance (O & M), and helpdesk function so that the mobile terminal may confirm the operation status of the wind turbine.

Further, for the configuration menu, the supervision unit 240 may provide a location function of adding, modifying, and deleting information on information on an area, a country, a site, and a turbine.

Further, for the plan maintenance, the corrective maintenance, and the prediction maintenance, the work history may include the work plan function of inquiring and registering the work plan, the work record function of inquiring the work record input to the issued work ticket, and the equipment tool function of inquiring the equipment and tool used for work.

Further, the components status may inquire the inventory status of spare part by site and request the purchase and the delivery of the components. The manual may include the DDMS function of registering and inquiring the DDMS document and the EIM function of registering and inquiring the EIM document. The report card and the term of guarantee may include a function of inquiring a report card and a term of guarantee of part.

Further, the mobile application menu may allow a mobile terminal to confirm the operation status of the wind turbine using the monitoring function. Further, an in-house staff or a worker of a cooperative firm may register a work record using a mobile terminal when the work ticket is issued through the O & M function. The helpdesk function may use the mobile terminal to register the questions or issue matters of the turbine and write the history management.

Further, the component management menu is to manage new warehousing and shipping, a turbine model, and a components status and as illustrated in FIG. 8, may include the inventory management, the turbine management, the database (DB) management, and the setting management.

Further, the inventory management may include the warehousing and shipping function of a machine component that inquires the warehousing and shipping history of the machine component and the electronic component warehousing and shipping function that inquires the warehousing and shipping history of the electronic component.

Further, the turbine management may perform the turbine classification system function of inquiring the turbine classification system based on the model management menu, the turbine model function of adding, modifying and inquiring the turbine model, and the component model function of adding, modifying, and inquiring the component model and may inquire the turbine status based on the turbine status menu.

Further, the DB management may add, modify, and inquire the equipment information using the equipment DB menu, add, modify, and inquire the component warehouse information using the warehouse DB menu, add, modify, and inquire the supplier information using the supplier DB menu, or add, modify, and inquire the tool information using the tool DB menu.

Further, the setting management may include the model setting menu for managing model setting, the notification setting menu for setting items to be notified through e-mail and SMS, the account setting menu for managing the account of the component management user, and/or the authority setting menu for setting authority for the component management user.

Further, the component management menu may include the QR code menu for managing the QR code information input from a cooperative firm and providing the user interface (UI) that may issue the QR code.

Further, the mobile application menu may recognize the shipping information when the components are shipped from a cooperative firm and inputs the recognized shipping information to a database through a mobile terminal and may connect the previously input component information to the turbine of the corresponding site when the turbine is assembled.

Further, the helpdesk function is to display latest writings of each bulletin board on the home screen in a card and list form and perform a unified search thereon and as illustrated in FIG. 9, may include the official announcement menu, the frequently asked questions (FAQ) menu, the customer support menu, the report menu, and the setting menu.

Further, the official announcement menu may allow a manager to register the known writing and inquire or confirm the known matters posted by the manager and the frequently asked questions menu may inquire or confirm the questions posted by the manager.

Further, the customer support menu may post or confirm a customer related content and the report menu may include a periodic report function of registering, modifying, and inquiring a periodic report and a prediction report function of registering, modifying, and inquiring a prediction report.

Further, the setting menu may include a user setting function of adding, modifying, and inquiring a helpdesk user or setting authority by user.

Meanwhile, as illustrated in FIG. 10, the dashboard menu for the automatic diagnosis of the wind turbine may include the overview menu and the setting menu.

Further, the overview menu may represent the collection status of the SCADA and CMS data of the registered turbines using the turbine status function, represent the live system status using the diagnosis function, or start data-linking with the system monitoring and supervision unit using the acquisition start function.

Further, the setting menu may display the information of the turbines currently registered through the turbine list function, set the interval time at which the system monitoring item data are transmitted to the supervision unit through the diagnosis setting function, or detecting an HDD to select and change the hard disk (HDD) of which the consumed amount needs to be checked.

Further, the setting menu may set the process name that monitors the process operation status using the process detect setting function, set the process path for forcibly and automatically restarting the process, or set the auto start when the operation is not performed during the process monitoring.

Further, the setting menu may set the database access IP address, the database access port number, the database access SID or data source, the database access ID, the database access password using the database setting function.

Further, the supervision unit 240 may provide information of a power curve representing the turbine performance, an SCADA, CMS trend confirming a data history, an accumulated histogram for comparing a normal data between the turbines with an error data, an error occurred number, abnormality detection for early alarm, or the like as illustrated in FIGS. 12A to 12E based on the data management function using the data collected by the data collection unit 210 from each site server 260 to 264. FIGS. 12A to 12E are diagrams illustrating an example of information provided by a data management function according to an exemplary embodiment.

Further, for the wind operation and maintenance (O & M), the supervision unit 240 may provide information of the turbine work plan/record, the component status, the operation and maintenance manual, the term of guarantee, or the like.

Meanwhile, the supervision unit 240 may be linked with a mobile device carried by the O & M manager or the interested party that manages each wind farm to provide an operation status or a work history of each wind turbine within a wind farm, component warehousing, and a bulletin board message registration status on a screen of the mobile device as illustrated in FIGS. 13A to 13D. FIGS. 13A to 13D are diagrams illustrating an example of providing a turbine operation status within a wind farm to a mobile device, according to an exemplary embodiment. As illustrated in FIGS. 13A to 13D, the supervision unit 240 may provide the operation status of the wind turbine within the wind farm, the work history of the O & M, the component warehousing status, information on customer bulletin board message registration and confirmation of a help desk to the mobile device.

Therefore, the manager, the interested party, or the like of the wind generation may perform works associated with the operation and maintenance of the wind turbine through the mobile device carried by him/her without going to a workplace or a control office.

As described above, according to an exemplary embodiment, it is possible to realize the wind farm supervision monitoring system capable of minimizing the influence of the accessibility according to a weather condition, the supply and demand of parts and equipment, the number of workers, or the like when the operation and maintenance (O & M) for managing at least one wind farm is performed, acquiring the data from the plurality of wind farms based on the management control data acquisition (SCADA) and the status monitoring system (CMS) to early detect the failure of parts and prevent the critical accident, sharing the turbine operation status, the operation and maintenance plan and record, the customer's requirements, or the like on a web and performing the cooperative work to manage the alarms and events of several wind turbines and provide the information for establishing the operation and maintenance.

According to an exemplary embodiment, it is possible to minimize the influence of the accessibility according to the weather condition, the supply and demand of parts and equipment, the number of workers, or the like, early detect the failure of parts, and prevent the critical accident.

Further, it is possible to share the turbine operation status, the operation and maintenance plan and record, the customer's requirements, or the like on the web and perform the cooperative work to manage the alarm and event of several wind turbines and establish the operation and maintenance plan.

Further, it is possible to collect the status data of the wind turbine in the wind farm by the automatic diagnosis.

Further, it is possible to set the range appropriate for the special situation within the wind farm and collect only the data corresponding to the setting.

Further, it is possible to monitor the process of the server installed within the wind farm in real time to reduce the load of the CPU while managing the plurality of wind farms.

Further, it is possible to display various data such as the output of the wind turbines in each wind farm, the vibration, the error rate, the wind direction, and the wind speed that are managed by the supervision system.

Further, the manager, the interested party, or the like may confirm the official announcement, the frequently asked questions (FAQ), or the like, for each wind farm based on the online wind helpdesk.

Further, the manager, the interested party, or the like may use his/her own smart terminal to receive the support of the helpdesk status or inquire the helpdesk status.

Further, the interested part, or the like may search for the serial number or confirm the identity of the connected user and then inquire the question contents on the wind turbines within each wind farm.

Further, the manger, the interested party, or the like may register, modify, or inquire the periodic reports or the forecast reports for the status of the wind turbines within each wind farm and automatically create the forecast reports based on the input status data.

Further, it is possible to select and inquire the period in which the equipment may be operated and calculate the time in which the equipment may be operated based on the data collected from the supervision monitoring server.

Further, it is possible to automatically issue the work ticket for the operation and maintenance of the wind turbine and provide the direction for the worker to most efficiently perform the operation and maintenance based on the work ticket.

Further, it is possible to perform the post-maintenance after the breakdown, the operation and maintenance for each part every set period, the operation and maintenance according to the past, current, and future by predicting the operation and maintenance date based on the collected data, etc., for the operation and maintenance of the wind turbine.

Further, it is possible to calculate each element value using various domains (time, conversion of time into FFT, conversion of time into enveloped FFT) when the breakdown of the wind turbine is detected.

Further, it is possible to confirm the basic specification and the current status of the on-site parts and facilities based on the graphic user interface (GUI) and confirm the components status, the tool status, or the like in real time.

Those skilled in the art will appreciate that because various modifications and alterations may be made without departing from the spirit or essential feature of the inventive concept, the above-mentioned exemplary embodiments are not restrictive but are exemplary in all aspects. It should be interpreted that the scope of the inventive concept is defined by the following claims rather than the above-mentioned detailed description and all modifications or alterations deduced from the meaning, the scope, and equivalences of the claims are included in the scope of the inventive concept.

What is claimed is:

1. A wind farm supervision monitoring apparatus for supervising and managing a plurality of wind farms, in which each wind farm of the plurality of wind farms includes at least one wind turbine and a site server acquiring data of supervisory control and data acquisition (SCADA) and monitoring a status of a condition monitoring system (CMS) using a management control for each wind turbine, the wind farm supervision monitoring apparatus comprises:
    a user interface (UI) unit configured to display a location of the site server on a map along with a dashboard menu, a navigation menu, and an alarm & event menu;
    a data collection unit configured to
        collect data about status monitoring of each wind turbine from the site server that is installed at a remotely located wind farm and is accessible to workers at the remotely located wind farm, and set conditions used for determining whether the wind turbine is in an abnormal status based on the collected data;

an abnormality status detection unit configured to detect an abnormality status of each wind turbine based on the data about the status monitoring of each wind turbine and issuing an alarm based on the detecting the abnormality status; and a supervision unit, accessible to managers who are not at the remotely located wind farm, configured to provide a turbine operation status of each wind turbine using the dashboard menu for managing operation and maintenance of each wind turbine, establish an operation and maintenance (O & M) plan for the detected abnormality status of the wind turbine, communicate with the site server and a mobile terminal of a worker at the remotely located wind farm, with a web service providing a satellite map or weather forecast information, and with a portal system that includes a document management system (DMS), an enterprise resource planning (ERP) system, and a tool total management system (TTMS) to perform components management, a work plan and record, a cooperation of an on-site work problem, and tool management, and control the operation and maintenance according to the turbine operation status by using a component management menu, a mobile application menu, and a configuration menu, the mobile application menu providing confirmation of the turbine operation status to a mobile terminal of a worker at the remotely located wind farm, and wherein the wind farm supervision monitoring apparatus performs setting conditions used for determining whether a wind turbine is in an abnormal status, receiving the data, which indicating status of each wind turbine, from the site server, analyzing the received data based on the set conditions, detecting whether the wind turbine is in an abnormal status based on the analyzed data, displaying the analyzed data for the turbine operation status of each wind turbine on a screen of a user interface (UI) corresponding to the dashboard menu, transforming a screen for the dashboard menu into a screen for establishing the O & M plan when the wind turbine is detected to be in an abnormal status, collecting information on a weather forecast, a components status, and a tool status to early detect the abnormal status using data management, automatically issuing, to the mobile terminal of the worker, a work ticket for the maintenance when the wind turbine is detected to be in an abnormal status, and receiving, from the mobile terminal, a registration of a work record in response to the issued work ticket.

2. The wind farm supervision monitoring apparatus of claim 1, wherein the work ticket suggests a direction in which a worker needs to progress based on the established O & M plan, and wherein the supervision unit is further configured to collect an early alarm, the weather forecast, and the component and tool status information using the SCADA data and the CMS data provided from the at least one site server to establish the O & M plan, and perform a cooperative work using a helpdesk menu by receiving a customer request and answering the customer request.

3. The wind farm supervision monitoring apparatus of claim 2, wherein the supervision unit is further configured to set up the dashboard menu by selecting one from among (i) a run to failure which performs maintenance after an operation is performed until a part of the wind turbine breaks, (ii) a periodic maintenance which periodically performs the maintenance for a predetermined period, and (iii) a status-based maintenance which acquires a facility status based on the monitored status of the CMS.

4. The wind farm supervision monitoring apparatus of claim 1, wherein the dashboard menu includes an estimation function; a status function; and a configuration function, wherein the estimation function includes a management function; and a cost function, the management function including a status about a number of turbines; a number of wind farms; a number of countries; a number of failures; mean time to repair (MTTR) and mean time between failure (MTBF); accessibility to each site; a number of spare components per site; and periodic maintenance for each turbine, wherein the status function includes a network function; and a repository function, and wherein the configuration function of the dashboard menu is configured to set a wind speed, a wave height, and priority and a threshold value of equipment including a network/server and a hard disk.

5. The wind farm supervision monitoring apparatus of claim 1, wherein the supervision unit is further configured to perform a function of inquiring a work history for each part of the wind turbine, by using information for the component management menu including a component status, a manual, a report card, and a term of guarantee and a function of confirming a location of a component, provide a supervision function, an operation and maintenance (O & M) function, and a helpdesk function for the mobile application menu, and provide, by using the configuration menu, a location function of adding, modifying, and deleting information on an area, a country, a site, and a turbine.

6. The wind farm supervision monitoring apparatus of claim 5, wherein the work history for each part of the wind turbine indicates information for plan maintenance, run to failure, and prediction maintenance, wherein the work history includes a work plan function of inquiring and registering a work plan, a work record function of inquiring a work record input to an issued work ticket, and an equipment tool function of inquiring equipment and tool used for work, wherein the component status indicates information to inquiry an inventory status of a spare part by site and request a purchase and a delivery of components, wherein the manual includes a distributed database management system (DDMS) function of registering and inquiring a DDMS document and an enterprise information management (EIM) function of registering and inquiring an EIM document, and wherein the report card and the term of guarantee include a function of inquiring a report card and a term of guarantee of components.

7. The wind farm supervision monitoring apparatus of claim 5, wherein the mobile application menu is configured to
perform a monitoring function to confirm the turbine operation status,
perform the O & M function to enable an in-house staff or a worker of a cooperative firm to register a work record, and
perform a helpdesk function to register questions or issue matters of the wind turbine and to write history management.

8. The wind farm supervision monitoring apparatus of claim 1,
wherein the component management menu is configured to manage new warehousing and shipping, a turbine model, and a component status and includes inventory management, turbine management, database (DB) management, and setting management,
wherein the inventory management includes:
   a machine component warehousing and shipping function of inquiring a warehousing and shipping history of a machine component; and
   an electronic component warehousing and shipping function of inquiring a warehousing and shipping history of an electronic component,
wherein the turbine management is configured to perform:
   a turbine classification system function of inquiring a turbine classification system based on a model management menu;
   a turbine model function of adding, modifying and inquiring the turbine model; and
   a component model function of adding, modifying, and inquiring a component model, the turbine management inquiring a turbine status based on a turbine status menu,
wherein the DB management is configured to add, modify, and inquire i) equipment information using an equipment DB menu, ii) component warehouse information using a warehouse DB menu, iii) supplier information using a supplier DB menu, or iv) tool information using a tool DB menu, and
wherein the setting management includes i) a model setting menu for managing model setting, ii) a notification setting menu for setting items to be notified through e-mail and short message service (SMS), iii) an account setting menu for managing an account of a component management user, and iv) an authority setting menu for setting authority for a component management user.

9. The wind farm supervision monitoring apparatus of claim 1,
wherein the component management menu includes a quick response (QR) code menu for i) managing QR code information input from a cooperative firm and ii) providing a user interface (UI) that issues the QR code, and
wherein the mobile application menu is configured to recognize shipping information when components are shipped from the cooperative firm, to input the recognized shipping information to a database through the mobile terminal, and to connect previously input component information to the wind turbine of a corresponding site when the wind turbine is assembled.

10. The wind farm supervision monitoring apparatus of claim 5,
wherein the helpdesk function is configured to display writings posted on each bulletin board, the writings displayed on a home menu screen in a card and list form; and to perform a unified search of the writings,
wherein the helpdesk function includes an official announcement menu, a frequently asked questions (FAQ) menu, a customer support menu, a report menu, and a setting menu,
wherein the official announcement menu allows a manager to register known writing and inquires or confirms an official announcement posted by the manager,
wherein the FAQ menu inquires or confirms a question posted by the manager,
wherein the customer support menu posts or confirms a customer related content,
wherein the report menu includes i) a periodic report function of registering, modifying, and inquiring a periodic report and ii) a prediction report function of registering, modifying, and inquiring a prediction report, and
wherein the setting menu includes a user setting function of adding, modifying, or inquiring a helpdesk user or setting authority by user.

11. The wind farm supervision monitoring apparatus of claim 1,
wherein the dashboard menu includes an overview menu; and a setting menu,
wherein the overview menu represents a collection status of the SCADA and CMS data of registered wind turbines using a turbine status function, represents a live system status using a diagnosis function, or represents start data-linking with a system monitoring and supervision unit using an acquisition start function, and
wherein the setting menu is configured to display information of currently registered wind turbines using a turbine list function, to set an interval time at which a system monitoring item data is transmitted to the supervision unit using a diagnosis setting function, to select and change a hard disk (HDD) of which a consumed amount needs to be checked, to set a process name monitoring a process operation status using a process detect setting function, to set a process path for forcibly and automatically restarting a process, to set an auto start when an operation is not performed during the process monitoring, and to set a database access Internet protocol (IP) address, a database access port number, a database access secure identifier (SID) or data source, a database access identifier (ID), and a database access password using a database setting function.

12. A wind farm supervision monitoring method for supervising and managing a plurality of wind farms, in which a wind farm of the plurality of wind farms includes at least one wind turbine and a site server acquiring data of supervisory control and data acquisition (SCADA) and monitoring a status of a condition monitoring system (CMS) using a management control for each wind turbine, the wind farm supervision monitoring method comprising:
setting conditions used for determining whether a wind turbine is in an abnormal status,
receiving the data, which indicating status of each wind turbine, from the site server that is installed at a remotely located wind farm and is accessible to workers at the remotely located wind farm,
analyzing the received data based on the set conditions,
detecting whether the wind turbine is in an abnormal status based on the analyzed data, displaying the analyzed data for turbine operation status of each wind turbine on a screen of a user interface (UI) corresponding to a dashboard menu, transforming a screen for the dashboard menu into a screen for establishing an operation and maintenance (O & M) plan when the wind turbine is detected to be in an abnormal status, collecting information on a weather forecast, a components status, and a tool status to early detect the abnormal status using data management, automatically issuing, to a mobile terminal of a worker at the remotely located wind farm, a work ticket for the maintenance when the wind turbine is detected to be in an abnormal status, receiving, from the mobile terminal, a registration of a work record in response to the issued work ticket, providing, by a supervision unit, a turbine operation status of each wind turbine using the dashboard menu for managing operation and maintenance of each wind turbine, establishing, by the supervision unit, the O & M plan for the detected abnormality status of the wind turbine, and communicating, by the supervision unit, with the site server and a mobile terminal of a worker at the remotely located wind farm, with a web service providing a satellite map or weather forecast information, and with a portal system that includes a document management system (DMS), an enterprise resource planning (ERP) system, and a tool total management system (TTMS) to perform components management, a work plan and record, a cooperation of an on-site work problem, and tool management, and controlling, by the supervision unit, the operation and maintenance according to the turbine operation status by using a component management menu, a mobile application menu, and a configuration menu, the mobile application menu providing confirmation of the turbine operation status to the mobile terminal of the worker.

13. The wind farm supervision monitoring method of claim 12, further comprising:

displaying a location of the site server on a map along with the dashboard menu, a navigation menu, and an alarm & event menu;

collecting data about status monitoring of each wind turbine from the site server; and detecting, by an abnormality status detection unit, an abnormality status of each wind turbine based on the data about the status monitoring of each wind turbine and issuing an alarm based on the detecting the abnormality status.

14. The wind farm supervision monitoring method of claim 12, wherein the work ticket suggests a direction in which a worker needs to progress based on the established O & M plan, and wherein the establishing the O & M plan comprises:
collecting an early alarm, a weather forecast, and component and tool status information using the SCADA data and the CMS data provided from the at least one site server, and performing a cooperative work using a helpdesk menu by receiving a customer request and answering the customer request.

15. The wind farm supervision monitoring apparatus of claim 1, wherein the supervision unit is further adapted to be in operative communication with the mobile terminal such that wind farm supervision and monitoring based on the work ticket are achieved.

16. The wind farm supervision monitoring method of claim 12, wherein the supervision unit, which is accessible to managers who are not at the remotely located wind farm, is further adapted to be in operative communication with the mobile terminal such that wind farm supervision and monitoring based on the work ticket are achieved.

17. A system for wind farm supervision and monitoring, the system comprising:

a plurality of wind farm sites, with each site having wind turbines that are in operative communication with one or more site servers, each of the one or more site servers collecting data upon satisfaction of special conditions that have been set for each wind turbine, the data collected by acquiring data of supervisory control and data acquisition (SCADA) and monitoring a status of a condition monitoring system (CMS) using a management control for each wind turbine; and a supervision unit adapted to support data collection, abnormality status detection, wind data management and user interfacing with respect to the wind farm sites through operative communication with the site servers, wherein the supervision unit is further adapted to support operation and maintenance (O&M) functions, geographical and weather information gathering and work collaboration with respect to the wind farm sites through operative communication with one or more portal systems and web services, wherein the site servers are accessible to O&M Engineers at each remotely located wind farm site and the supervision unit is accessible to O&M Managers, Project/Product Managers and Technical Experts who are not at the remotely located wind farm sites, whereby support of at least the O&M functions and work collaboration is facilitated by:

a component management menu provided to at least one among the O&M Managers, Project/Product Managers and Technical Experts via a multiple monitor graphical user interface (GUI), a mobile application menu provided to the O&M Engineers via a graphical user interface (GUI) on a mobile terminal of a worker at one of the remotely located wind farm sites, and a configuration menu provided to at least one among the O&M Managers, Project/Product Managers and Technical Experts via the multiple monitor graphical user interface (GUI), and wherein the supervision unit is further adapted to provide a turbine operation status of each wind turbine using a dashboard menu for managing operation and maintenance of each wind turbine, establish an O&M plan for the detected abnormality status of the wind turbine, communicate with the site server and the mobile terminal of the worker, with a web service providing a satellite map or weather forecast information, and with a portal system that includes a document management system (DMS), an enterprise resource planning (ERP) system, and a tool total management system (TTMS) to perform components management, a work plan and record, a cooperation of an on-site work problem, and tool management, and control the operation and maintenance according to the turbine operation status by using a component management menu, a mobile application menu, and a configuration menu, the mobile application menu providing confirmation of the turbine operation status to the mobile terminal of the worker.

18. The system of claim 17, wherein the supervision unit cooperates is further adapted to cooperate with the mobile terminal to provide to the O&M a work ticket that contains instructions about the O&M functions and work collaboration which needs to be done at the remotely located wind farm site.

19. The system of claim 18,
  wherein the dashboard menu is included in the multiple monitor graphical user interface (GUI) and shows estimation items for management factors and costs, status items for networks and site computers, and configuration items for wind turbine features, and
  wherein the mobile terminal is adapted to display operation status, work history, component warehousing and bulletin board message registration via the mobile application menu.

20. The system of claim 19, wherein the site servers and the supervision unit are adapted to support cloud server connection, Supervisory, Control and Data Acquisition (SCADA), big data, data interaction and data convergence techniques with respect to wind farm supervision and monitoring.

* * * * *